Aug. 24, 1965  G. McGUIRE  3,203,002
ADJUSTABLE DOCKBOARD WITH COUNTERBALANCING EXTENSION LIP
Filed Dec. 7, 1964  8 Sheets-Sheet 1

Aug. 24, 1965

G. McGUIRE

3,203,002

ADJUSTABLE DOCKBOARD WITH COUNTERBALANCING EXTENSION LIP

Filed Dec. 7, 1964

Aug. 24, 1965  G. McGUIRE  3,203,002
ADJUSTABLE DOCKBOARD WITH COUNTERBALANCING EXTENSION LIP
Filed Dec. 7, 1964  8 Sheets-Sheet 7

United States Patent Office

3,203,002
Patented Aug. 24, 1965

3,203,002
ADJUSTABLE DOCKBOARD WITH COUNTER-
BALANCING EXTENSION LIP
George McGuire, Thiensville, Wis., assignor to Kelley
Company, Inc., Milwaukee, Wis., a corporation of
Wisconsin
Filed Dec. 7, 1964, Ser. No. 416,254
32 Claims. (Cl. 14—71)

This invention, like the Kelley Reissue Patent No. 25,249, relates to adjustable dockboards adapted for installation on loading docks to span the gap between the dock and the bed of a truck or other carrier in position to be loaded or unloaded, and this application is a continuation-in-part of application Serial No. 276,382, filed April 29, 1963.

Dockboards of the type with which this invention is concerned have a ramp which is hingedly supported at its rear edge upon supporting structure fixed to the loading dock. An extension lip hinged to the front edge of the ramp hangs in a pendent position when the dockboard is not in use and the ramp is in its so-called cross traffic position flush with the floor of the dock. This hinged extension lip is lifted to an elevated position forming substantially an extension of the ramp as the board is prepared for use, and when the dockboard is in use this extension lip rests upon the bed of the truck or carrier being loaded or unloaded.

The entire structure is set into a shallow pit in the dock with the rear hinged edge of the ramp flush with the top of the dock and the front edge of the ramp adjacent to the front of the dock. From its cross traffic position flush with the top of the dock, the ramp may be raised or lowered to accommodate trucks of different floor or bed heights. Biasing means, generally a group of heavy coil springs, acting through a pivoted lever arm, at all times urges the ramp unwardly but is restrained from doing so by a manually releasable hold-down device which is so constructed as to allow the ramp to "float" up and down with changes in the height of the truck or carrier bed.

As in the Kelley et al. Patent No. 3,117,332 and the Pfleger et al. Patent No. 3,137,017, the extension lip is automatically lifted to an elevated position as the ramp rises. The means by which this automatic elevation of the extension lip is effected includes a snap line, i.e. a wire rope or cable having one end thereof connected to the stationary supporting or mounting structure of the dockboard and its other end connected to an actuating lever which forms part of the lip lifting means.

As the extension lip is thus automatically lifted, a lip holding or supporting means is automatically rendered operative to support the lip in a position somewhat short of its fully elevated position in which latter position it is substantially flush with the ramp. Thus, as the ramp is lowered by the application of weight thereon—for instance, by an attendant walking out onto the ramp—the extension lip not only comes to rest upon the bed or floor of a carrier in position in front of the dockboard, but also moves to its fully elevated position, which is firmly defined, so that the ramp is supported at its front edge by the carrier and the weight of the lip is removed from the lip supporting means, thereby allowing the latter to resume its inoperative condition.

Since the hinged extension lip is quite heavy, it obviously requires considerable force to swing the same high enough to enable the lip holding or supporting means to be rendered operative to support the lip against dropping. Heretofore, this entailed rapid acceleration in the ascent of the ramp so that the inertia of the lip as the ascent of the ramp was suddenly stopped by the snap line connecting the lip lifting mechanism with the stationary mounting structure, could bring the lip to its required height, and to obtain this needed acceleration and consequent inertia, the ramp lifting springs had to be quite strong; and, of course, the heavier the extension lip was the stronger the ramp lifting springs had to be.

In the smaller sizes of dockboards, this did not pose too serious a problem, for in these smaller sizes the ramp lifting springs seldom had to be so strong that a person of ordinary weight could not lower the ramp by walking out onto it a short distance. But as the dockboards increased in size and the weight of the hinged extension lip became correspondingly greater, a man of average weight could not lower the board unless he walked all the way out to the front edge of the board. Hence, the means heretofore employed to lift the extension lip limited the size of these dockboards. It also limited the length and weight of the lip, even in the smaller size dockboards.

This invention overcomes this objection and, for all intents and purposes, removes the limitation upon the maximum size of dockboard that can be easily handled by a single attendant. The invention achieves its objective and purpose by counterbalancing a substantial portion of the gravity-produced moment of the extension lip about its hinged connection with the ramp, in such a way that the counterbalancing force does not interfere with the lip assuming its pendent position and remaining in that position when the board is not in use.

Stated in another way, one of the primary purposes and objects of this invention is to provide an improved adjustable dockboard of the type having an extension lip hinged to the front edge of the board or ramp, wherein the extension lip is counterbalanced, but in such a way that, when the lip is in its pendent position, the effect of the counterbalancing force upon the extension lip is nullified; but as the extension lip begins its upward swing, the counterbalancing means increases in effectiveness.

It is also a feature and object of this invention to eliminate all dependence upon fast acceleration in the upward swing of the ramp and the inertia of the extension lip, for the elevation of the lip to its latched intermediate position; and, instead, to provide a lip lifting spring which is strong enough, of itself, to lift the lip upon release of the energy stored in the spring, together with a novel manner of loading or energizing the spring during lowering of the ramp, so that the spring may be loaded and secured in a loaded or energized condition by releasable latch means.

With this way of lifting the extension lip, the ramp can be raised with the lip in its pendent position, and then by simply releasing the stored energy of the spring, bring the lip to its latched position. Elevating the extension lip in this manner has the advantage of reducing the height to which the ramp must be raised in preparing the dockboard for use.

Heretofore the latch mechanism by which the lip was supported in an elevated position acted upon the lip through a relatively short lever arm; in fact this was the case in those embodiments of this invention which were disclosed in the aforesaid application Serial No. 276,382. Because of this, small deviations from prescribed clearance tolerances resulted in large variations in the angle at which the lip was supported, and also made engagement of the latch mechanism somewhat unreliable.

With a view towards overcoming the objections of past lip supporting devices, this invention has another of its objects to provide a lip supporting latch device which acts upon the lip through a much longer lever arm and hence is not nearly as critical in its clearance tolerance requirements.

Ordinarily when a truck backs into place in front of a dockboard which has been raised and has its lip elevated, the doors of the truck are open and the lip simply protrudes into the truck. There are times, however, when for one reason or another, the truck collides with the extended lip. To prevent damage to the dockboard when that happens, this invention has as another of its objects to provide yieldability in the lip supporting means whereby the lip will fold down if force is applied against it as when a truck being backed into position collides with it.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiments of the invention, constructed according to the best modes so far devised for the practical application of the principles thereof, and in which.

Referring now particularly to the accompanying drawings in which like numerals indicate like parts throughout the several views, the numeral 4 designates the stationary mounting or supporting structure of the dockboard which may be constructed in any suitable manner but is preferably fabricated from structural steel. It has parallel front and rear members 5 and 6 connected by parallel rails 7, only one of which is shown. At its rear, the supporting structure has a plurality of upright members 8—again only one of which is shown—which collectively support a cross member 9 to which the rear edge of a ramp structure, indicated generally by the numeral 10, is hingedly connected, as at 11.

The ramp structure 10, like the stationary supporting structure is preferably built of structural steel, and includes a plurality of parallel longitudinal rails 12—only one of which is shown—and a steel plate or deck 13, welded or otherwise secured to the rails 12. At its front edge, the ramp has an apron or rail 14 depending from its deck 13 and welded or otherwise secured to the longitudinal rails 12. For a purpose to be described, the front rail has a hole 15 medially of its ends and an outwardly offset bridge piece 16 defining the bottom of this hole.

At its rear edge, the ramp has an angle iron cross member 17 which is secured to the rails 12, and to the underside of the deck, the hinge connection 11 having one of its complementary parts secured to this angle iron cross rail 17.

An extension lip 18 is hinged to the front edge of the ramp, as at 19, to swing from a pendent position to an elevated working or operative extended position forming substantially an extension or continuation of the deck 13 of the ramp. The hinge 19 which connects the extension lip with the front edge portion of the ramp consists of lengthwise interposed tubes 20 and 21, which are respectively fixed to the underside of the lip and to the apron or front rail 14, and a hinge pin or pintle 22 received in these tubes.

The hinge 19 is of the knuckle joint variety, since the rear edge of the lip engages the front edge of the ramp deck and prevents further elevation of the lip when the lip is in its fully raised or elevated working position forming an extension of the ramp. Accordingly, in use, when the hinged lip comes to rest upon the bed of a carrier (indicated at B in broken lines in FIGURES 2 and 3), the ramp will be supported at its front by the carrier.

Figures 1, 4:
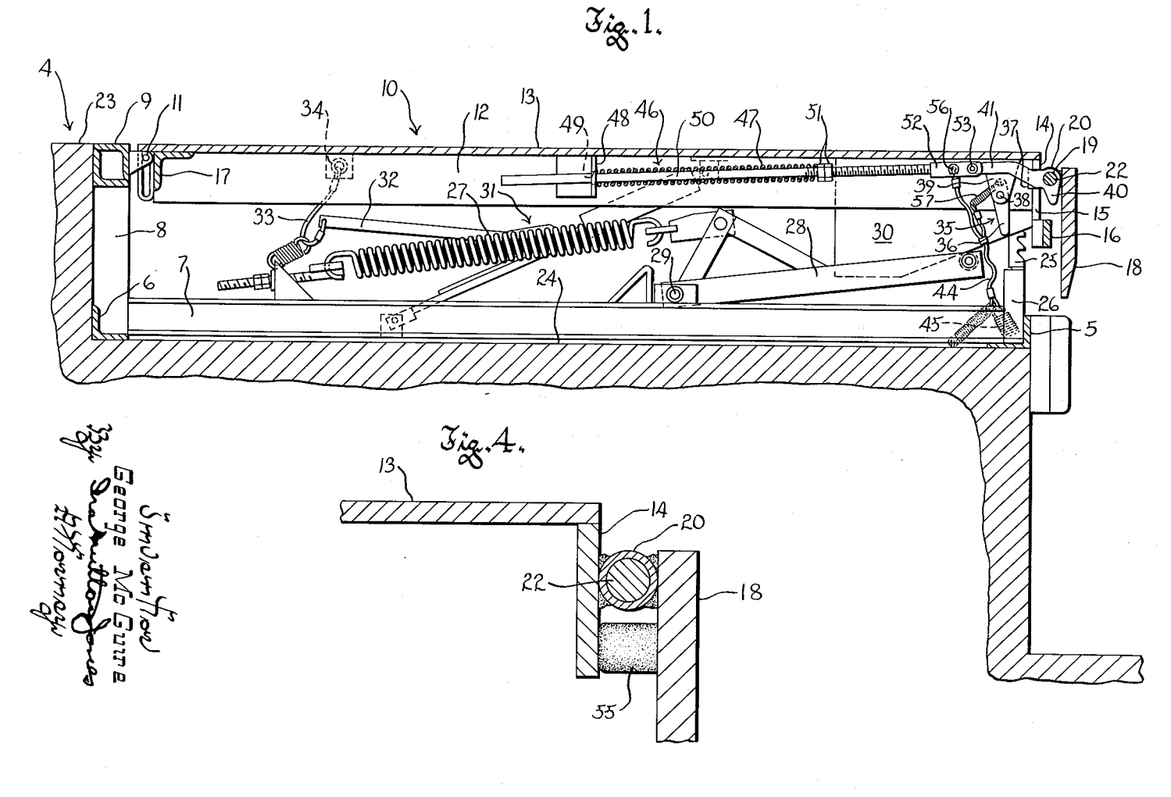
FIGURE 1 is a longitudinal sectional view through an adjustable dockboard installation, embodying this invention and illustrating the ramp in its cross traffic position, with the extension lip hanging in its pendent position.
FIGURE 4 is a detail sectional view through the front end portion of the ramp and extension lip, on a plane spaced laterally from that of FIGURE 1.

When the dockboard is installed on a loading dock 23, the entire structure is set into a shallow pit 24 formed in the dock, with the hinged rear edge of the ramp flush with the top of the dock and its front edge adjacent to the front of the dock. Hence, the ramp may occupy a cross-traffic position flush with the top of the dock, as shown in FIGURE 1, and may be tilted downwardly, if necessary, to accommodate a truck or other carrier, the bed or floor of which is below dock level; or it may be raised to a substantial angle above dock level.

The ramp is supported in its cross-traffic position by legs 25 depending from its front end portion to rest upon pedestals 26 at the front end of the supporting structure, there being two such hinged legs and two pedestals, one pair thereof at each side of the ramp.

The legs 25 and the manner in which they function to support the ramp in its cross-traffic position, and even in a position below-dock-level, constitutes the subject matter of the aforesaid Pfleger et al. Patent No. 3,137,017, issued June 16, 1964, to the assignee of this invention.

The ramp is biased upwardly by means of a group of heavy tension springs 27, only one of which is shown, anchored at one end to the mounting or supporting structure 4 and having their other ends connected to a lever arm 28. One end of the arm 28 is hingedly connected to the stationary supporting structure, as at 29; its other end bears against the bottom edge of a cam plate 30 fixed to the underside of the ramp. Hence, the springs 27 acting through the pivoted lever arm 28 and the cam plate 30 impart an upward thrust or bias upon the ramp tending at all times to raise the same to an upwardly inclined position projecting a substantial distance above dock level.

However, the ramp may be held in any lowered position by means of a hold-down device, indicated generally by the numeral 31. This hold-down device may be like the one shown in the aforesaid Patent No. 3,137,017. In any event, it is manually releasable by pulling upwardly upon a releasing arm 32. This may be done by means of a releasing cable or cord 33 connected to the arm and having a finger ring 34 accessible from above the deck of the ramp.

As noted hereinbefore, when the hold-down device 31 is released and the ramp is raised by the springs 27, the hinged extension lip 18 is automatically swung to an intermediate elevated position somewhat short of its fully elevated position, where it is supported by a lip-holding or supporting device indicated generally by the numeral 35. In the embodiment of the invention illustrated in FIGURES 1 to 5 inclusive, this lip supporting or holding device 35 comprises a pawl or latch 36 and an abutment 37 on one of the hinge-forming tubes 20 which are fixed to the extension lip. The pawl or latch 36 is pivotally mounted upon the underside of the ramp in any suitable manner, as by a pin 38 which passes through the hub of the pawl or latch, and a pair of ears 39 fixed to the underside of the ramp and between which the pawl is received, and in its operative position projects through the hole 15 to engage the abutment 37.

The weight of the pawl or latch is so distributed about its pivotal mounting that it normally hangs in an inoperative position outside the orbit of the abutment 37. Means to be hereinafter described are provided for swinging the pawl to its operative position.

The structure thus far described, essentially is no part of the present invention, but its description is at least helpful and perhaps necessary for an understanding of the invention.

The manner in which the hinged extension lip is lifted constitutes one of the primary features of this invention. Because of it:

(1) The weight and size of the extension lip can be practically disregarded in designing the dockboard, (2) Previous limitations upon the maximum size of the board are largely removed, and (3) Softer, less powerful ramp lifting springs may be employed to elevate the ramp, thus eliminating much of the shock to the structure and making it easier to lower the ramp.

The structure for lifting the hinged extension lip comprises a relatively short lever arm or finger 40, rockably mounted on the ramp in front of the hole 15 in its front rail, to swing about an axis parallel to the hinge axis of the lip and preferably coinciding with that axis. Thus the short arm or finger 40 may be pivoted upon the pintle 22, the adjacent tubes 20 and 21 being spaced from one another to accommodate the same.

Figure 2:
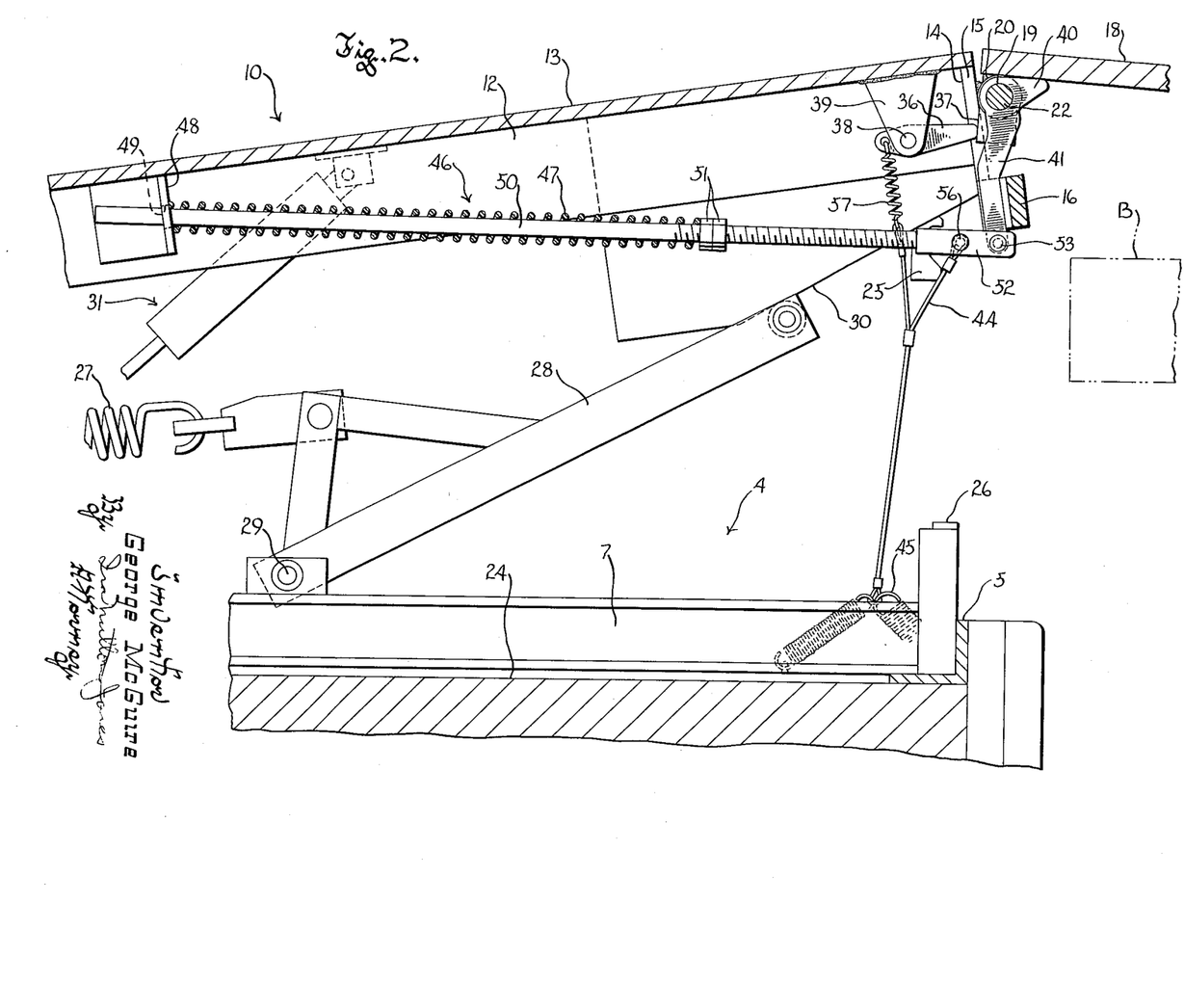
FIGURE 2 is an enlarged fragmentary cross sectional view through the front end portion of the ramp and the extension lip, illustrating the ramp raised and the extension lip in its intermediate supported position, preparatory to being lowered onto the bed of a truck or other carrier in position in front of the dockboard.
Figure 3:
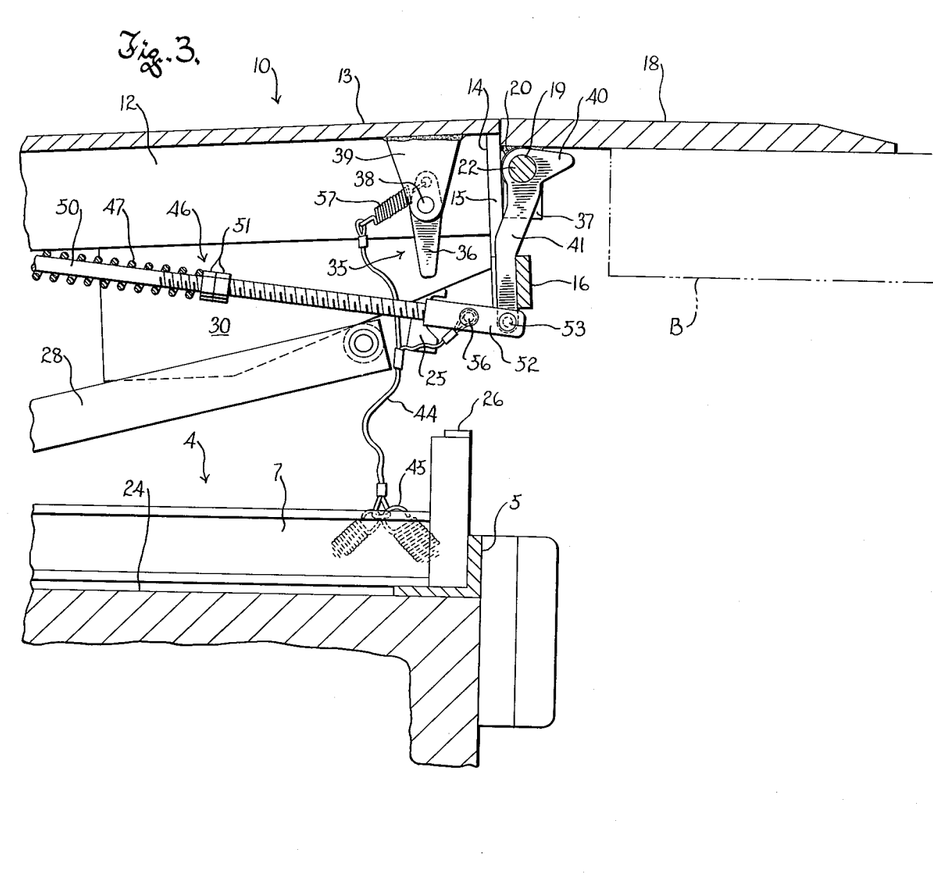
FIGURE 3 is a cross sectional view similar to FIGURE 2 but showing the ramp lowered and the extension lip resting upon the bed of the truck or carrier.
Figure 5:
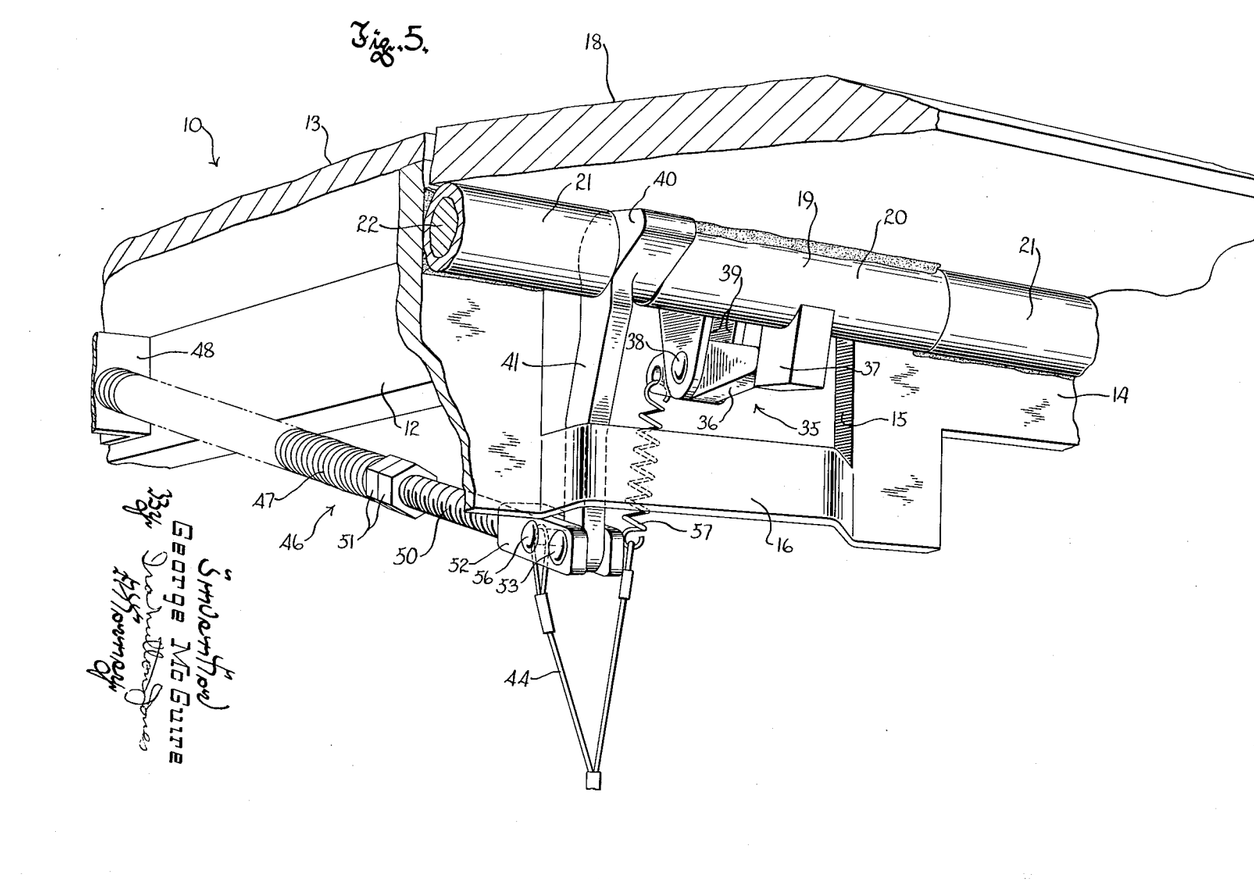
FIGURE 5 is a perspective view of a portion of the dockboard, to better illustrate the structure by which the extension lip is lifted to and supported in its intermediate or partially raised position.

Rocking the arm or finger counterclockwise, as viewed in FIGURES 1 and 2, causes it to bear against the underside of the extension lip and lift the same. Such motion is imparted to the arm or finger 40 by a downward pull upon a lever arm 41, which is fixed with respect to the arm or finger 40 and preferably is integral therewith. Together the short arm or finger 40 and the longer lever arm 41 may be considered a bell crank lever, and the angular relationship between them is such that when the extension lip hangs in its pendent position the arm 41 occupies a substantially horizontal position at the underside of the ramp; and when the extension lip is in its intermediate position shown in FIGURE 2, the arm 41 is spaced a slight distance from the rear of the offset bridge portion 16 of the front rail 14, though it may have contacted the bridge portion when the ramp reached its uppermost position and just before the supporting means 35 was activated and the weight of the lip was applied thereto.

The forwardly offset bridge portion 16 not only extends across and forms the lower edge of the hole 15 in the rail 14 to reinforce the rail at this point, but, as will be seen, it also provides protection for the arm 41 of the bell crank lever and the adjacent parts.

A snap line 44 having one end connected with the free end of the arm 41 and its other end connected through a tension spring 45 with the stationary supporting structure 4, is drawn taut as the ramp is elevated by its springs 27 and, in so doing, pulls the arm 41 from its substantially horizontal position beneath the ramp downwardly to its substantially vertical position shown in FIGURE 2. This, of course, swings the extension lip about its hinged mounting toward its elevated position, and far enough for the pawl or latch 36 to engage the abutment 37.

A feature of this invention is that elevation of the extension lip is effected not only by the tightening of the snap line and the consequent sudden interruption of the elevation of the ramp with its attendant inertia effect upon the lip, but also by a counterbalancing means, indicated generally by the numeral 46 and by which a major portion of the gravity-produced moment of the extension lip is borne during elevation of the lip.

In the embodiment of the invention illustrated in FIGURES 1 through 5, the counterbalancing means 46 comprises a relatively heavy compression spring 47 reacting between the ramp and the arm 41 which, as will appear hereinafter, can also be considered a crank arm. One end of the spring 47 bears against an abutment 48 fixed to the underside of the ramp. This abutment may be simply one flange of an angle iron welded to one of the rails 12, with a hole 49 in which one end portion of a rod 50 is slidably received. The rod 50 passes lengthwise through the spring and has stop nuts 51 threaded on its front end portion to provide an abutment for the other end of the spring, it being understood that the front end portion of the rod is screw threaded.

The front end of the rod 50 has a clevis 52 formed thereon or fixed thereto, to embrace the free end portion of the arm 41 and be pivotally connected thereto by a pin 53. It follows, therefore, that the force of the compressed spring 47 reacting between the fixed abutment 48 on the underside of the ramp and the free end of the arm 41, imparts torque to the arm, providing the arm is not on dead-center, that is, that its pivoted connection 53 with the rod is not directly on a straight line intersecting the axis about which the arm 41 turns and coinciding with the thrust axis of the spring.

The relationship of these parts is thus comparable and quite similar to that of a crank motion and, for this reason, the arm 41 may be considered a crank or moment arm. Also, when the arm 41 is in its substantially horizontal position beneath the deck of the ram (which position it occupies when the lip hangs in its pendent position) the arm and the rod 50, in effect form a toggle. If this toggle is directly on dead center, the spring cannot impart torque to the arm in either direction, and therefore cannot in anywise interfere with the position of the extension lip, so that the latter can hang freely in its pendent position. But to assure that the spring will not keep the lip from assuming and maintaining its pendent position—when this should be its position—it is preferred that the toggle be slightly broken in the upward direction or, in other words, that the arm 41 be slightly beyond dead center when the lip is in its pendent position. Thus, the parts are so proportioned and designed that before the clockwise motion of the arm 41 is arrested by its collision with the underside of the ramp, its connection 53 with the rod 50 crosses dead center.

Obviously, of course, as soon as the crank arm 41 begins to rotate in a counterclockwise direction about its pivotal mounting in response to a pull exerted thereon by the snap line 44 and said connection 53 crosses dead center, the thrust of the spring 47 imparts torque to the crank arm in the direction to lift the extension lip, and thus reduce the work required of the ramp raising springs 27 in elevating the lip. It is significant that as the proportion of weight of the lip borne by the lip lifting means increases, i.e. the gravity-produced moment of the lip resulting from the weight thereof not supported by its hinged connection with the ramp, the effective lever arm of the crank motion increases and with it the effectiveness of the spring.

Since the hinged extension lip must be free to drop back to its pendent position when the truck or carrier pulls away, it follows that the counterbalancing means, i.e. the spring 47, must not balance the full weight of the extension lip. Accordingly, the adjustment of the spring tension should be such that while a major portion of the gravity-produced moment of the extension lip is counteracted by the counterbalancing spring during elevation of the lip, it should definitely not be that entire moment. In practice it has been found advantageous to have the spring adjustment such that approximately eighty percent (80%) of the gravity-produced moment of the extension lip about its hinge axis is carried by the counterbalancing spring.

With this adjustment of the spring force, the extension lip drops readily but in a cushioned manner to its pendent position as the carrier pulls away from under it. Preferably the pendent position of the extension lip is defined by the engagement of the lip with a plurality of rubber bumpers 55 mounted on the front rail 14, one of the bumpers being shown in FIGURE 4.

Although the connection between the snap line 44 and the crank arm 41 may be effected in any desired manner, it is convenient to attach the snap line to a cross pin 56, which passes through the arms of the clevis 52.

The pawl or latch 36 is moved from its inoperative position to its operative position in time to dispose its free end behind the lug or abutment 37 by a tension spring 57 connected between the snap line 44 and the pawl or latch rearwardly of its pivot 39. Thus, as the snap line is drawn taut, the spring 57 pulls the pawl 36 into its operative position.

Figure 6:
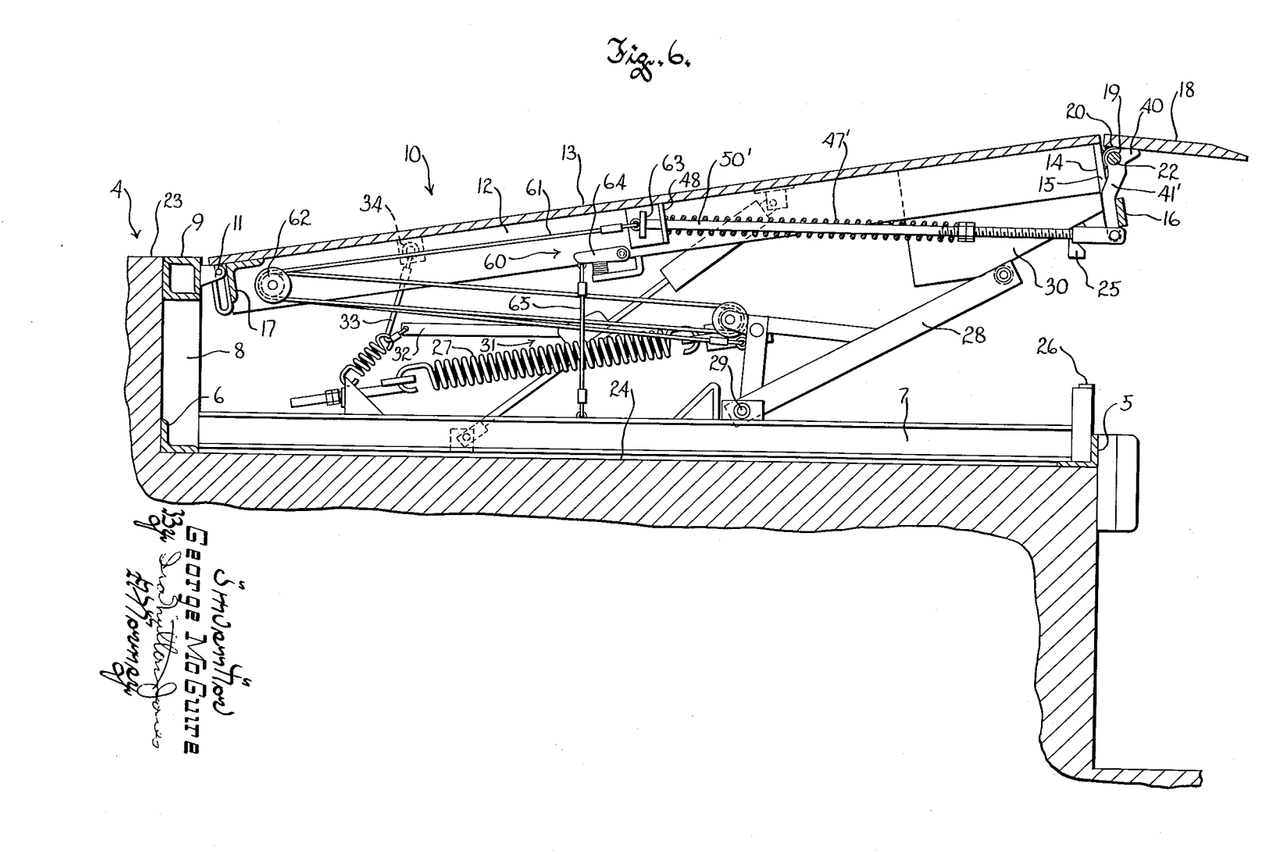
FIGURE 6 is a longitudinal sectional view through a dockboard installation, illustrating that embodiment of the invention wherein elevation of the hinged extension lip is effected solely by the release of energy stored in the counterbalancing spring, said view showing the ramp in its elevated condition, and the extension lip lifted.
Figure 7:
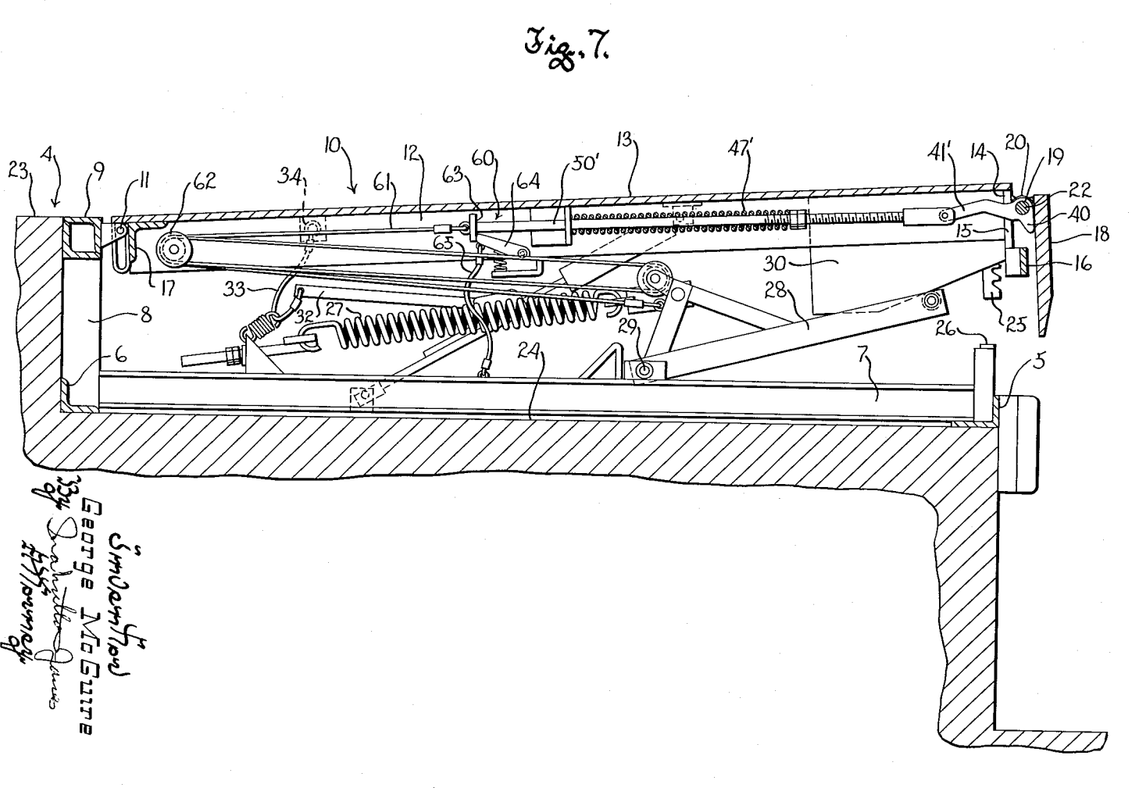
FIGURE 7 is a view similar to FIGURE 6, but showing the ramp in a partially lowered condition and the extension lip in its pendent position.

As shown in FIGURES 6 and 7, this invention also lends itself to adaptation in a form which completely obviates the need for any lifting force being applied to the extension lip in consequence of elevation of the ramp. For this purpose, means are provided to load or compress the spring 47' during descent of the ramp, and latch means, indicated generally by the numeral 60, serves to hold the spring in its cocked or loaded condition until the lip is to be lifted. To cock or load the spring, the end of the rod 50' which extends lengthwise through the spring and slidably through the hole in the fixed abutment 48 is connected by means of a cable 61 to the ramp raising lever arm 28, the cable being trained over a sheave 62 mounted at the underside of the ramp near its hinged rear edge.

As will be readily understood from a comparison of FIGURES 6 and 7, as the ramp is lowered by the attendant walking out on to it, or otewise, the arm 28 swings forward and thus exerts a pull on the cable 61. This draws the rod 50' back to compress the spring, and when the spring has been compressed the latch device 60 is engaged. With the latch device thus engaged, and the spring 47' cocked or loaded, the extension lip is in its pendent position in which position it remains even during elevation of the ramp by its springs in consequence of release of the hold-down device, and until the latch is disengaged. The latch device 60 may take any suitable form and, for purposes of illustration, has been shown as an abutment 63 fixed to the rod 50' and a spring pressed finger or bolt 64 pivoted to the underside of the ramp with its free end biased upwardly to lie in the path of the abutment 63 and snap in front of it as the abutment moves rearwardly past it. Disengagement of the latch can be effected in any suitable manner, as by simply pulling down on the bolt 64, but it is preferable to effect this release automatically as the ramp swings up. To do so, a snap line 65 is connected between the bolt 64 and the stationary supporting structure, as shown.

With the release of the latch, the force stored in the spring shifts the rod 50' forwardly, which—being connected to the crank arm 41'—lifts the extension lip. It should be understood, however, that in this form of the invention the crank arm 41' must not be permitted to swing to a dead center position for otherwise the release of the spring force could not impart torque to the arm 41', as needed to lift the extension lip.

The embodiment of the invention illustrated in FIGURES 8–12, inclusive, is distinguished by the fact that it combines counterbalancing of a substantial portion of the gravity-produced moment of the lip with an improved lip supporting mechanism, which not only affords greater latitude in the clearance tolerances required to assure reliable engagement of the lip supporting latch means, but also protects the structure against damage in the event a truck accidentally backs into the lip when the latter is in its extended or elevated position.

As in the embodiment of the invention illustrated in FIGURES 1–5, inclusive, the lip is elevated by a downward pull on a crank arm 141 which in this case has the lip lifting finger 140 formed integral therewith, the lip lifting motion being applied to the arm by the tightening of a snap line 144 as the ramp is raised. Also, as in the earlier described embodiment of the invention, a spring 69 reacting between a fixed abutment on the ramp and the free end of the crank arm 141 assists in elevating the lip, but in this instance the rod on which the counterbalancing spring is mounted is not simply one solid unit but rather consists of front end rear telescoped sections 70 and 71. The rear section 71 is a tube and has the front section 70, which is simply a rod with its front end portion threaded, slidably received therein. The extreme rear end of the tube 71 is closed, as at 72; and confined between the closed end 72 of the tube and the rear end of the rod 70 is a compression spring 73. This yieldingly tends to separate the telescoped sections and normally maintains the composite rod structure at its maximum length, which is defined by the engagement of a pin 74 fixed to the rod, with the front end of a slot 75 in the wall of the tube.

The rear end portion of the tube 71 is slidably received in a guide or support 76 fixed to the underside of the ramp and which may consist simply of a hole in one flange of an angle iron welded or otherwise secured to the ramp. This guide 76 also serves as an abutment for the counterbalancing spring 69 which surrounds the sleeve and has its front end bearing against an abutment 77 adjustably secured to the threaded rod 70.

Accordingly, the springs 69 performs the same counterbalancing function as the spring 47 in the previously described embodiment of the invention and, as in that embodiment, the spring 69 carries approximately eighty percent (80%) of the gravity-produced moment of the lip about its hinge axis.

When the ramp is raised and the snap line 144 becomes taut, the arm 141 is pulled down toward its operative position and in so doing elevates the lip with the assistance of the spring 69. During this operation the telescoped rod structure of course moves endwise in a forward direction drawing its rearmost end portion completely out of a hole 79 in a cross rail 80 in which hole the rear end portion of the tube is slidably received.

Figures 8, 9, 10, 13, 14:
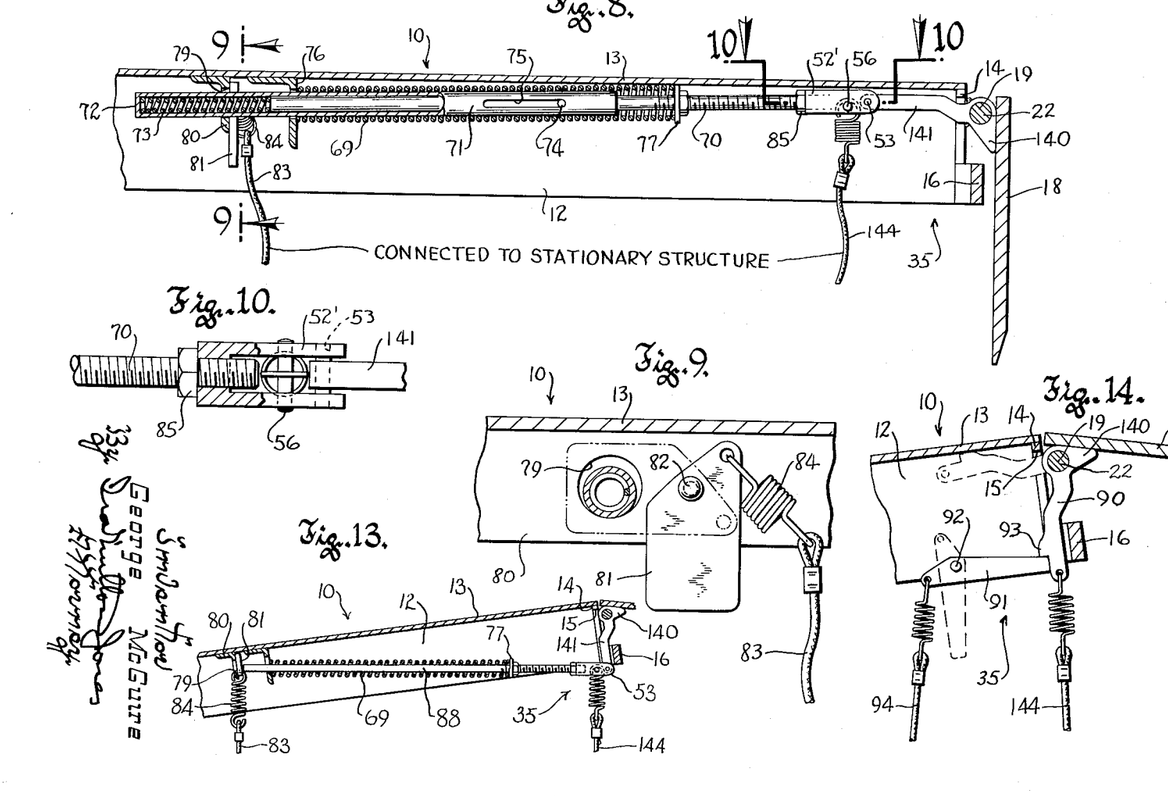
FIGURE 8 is a sectional view through the ramp and its hinged extension lip, illustrating another embodiment of this invention equipped with the improved lip support which permits greater latitude in clearance tolerance and incorporates protection against damage by trucks backing into the extended lip.
FIGURE 9 is a detail cross sectional view through FIGURE 8 on the plane of the line 9—9.
FIGURE 10 is a fragmentary detail sectional view through FIGURE 8 on the plane of the line 10—10.
FIGURE 13 is a view similar to FIGURE 11, but illustrating a slightly modified embodiment of the lip support.
FIGURE 14 is a sectional view through the front end post of the ramp and its hinged lip, illustrating another adaptation of the improved lip support.

The raising of the ramp also moves a latch plate or stop device 81 which is pivoted, as at 82, to the cross member 80, into an operative position closing the hole 79 and blocking rearward movement of the tube 71. The latch plate 81 normally hangs in an inoperative position, as shown in FIGURE 9, but is swung to its operative position by the tightening of a snap line 83 which has one end thereof connected to the latch plate and its other end suitably secured to the stationary structure. A spring 84 is preferably connected in series with the snap line.

Figures 11, 12:
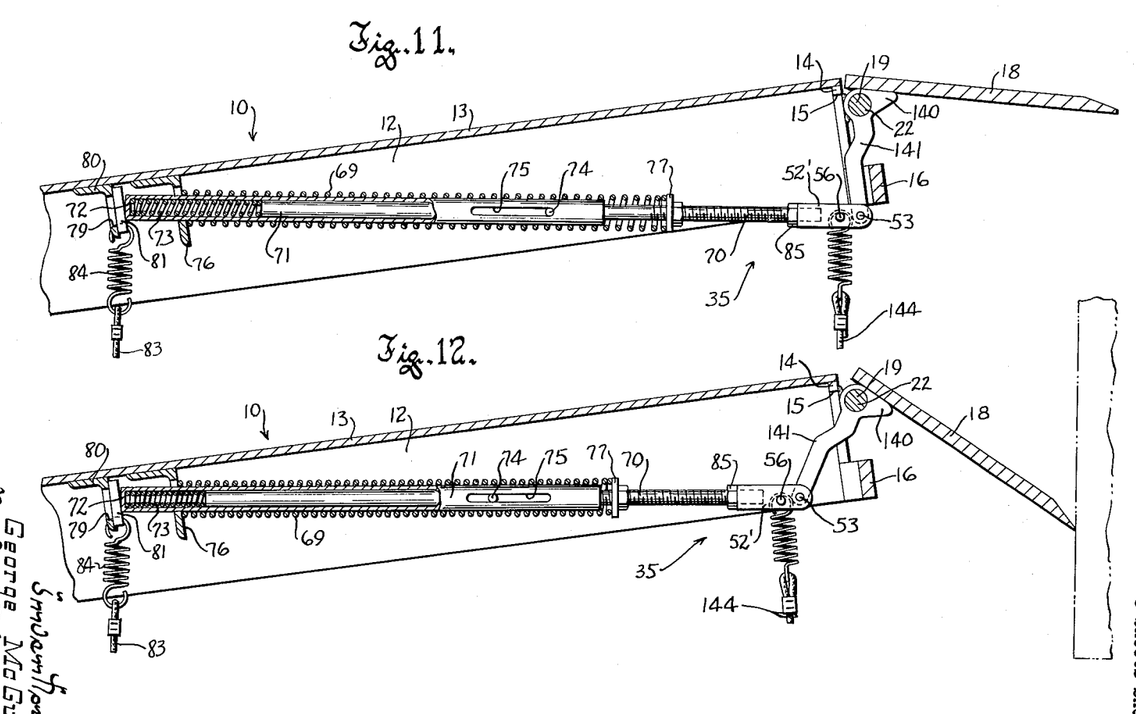
FIGURE 11 is a view similar to FIGURE 8, but illustrating the ramp in its raised condition, and the hinged lip elevated or extended.
FIGURE 12 is a view similar to FIGURE 11 showing how the lip supporting means yields to prevent damage to the dockboard in the event a truck backs into the extended lip.

Since the two springs 69 and 73 together support more than the entire gravity-produced moment of the lip, it follows that when the parts are in their positions shown in FIGURE 11 and the lip is in its elevated or extended position, the combined spring forces will be sufficient to hold the arm 141 in its operative lip supporting position. However, in the event of the application of an external force on the edge of the extended lip, as when a truck—shown in dotted lines in FIGURE 12—accidentally backs into the lip, both springs will yield and permit the lip to be folded down before damage to any part of the structure takes place.

An especially significant and advantageous aspect of the lip support illustrated in FIGURES 8–12, resides in the fact that it acts upon the lip through a relatively long lever arm—namely, the full length of the arm 141. In practice, this is at least six inches (6″) which compares with approximately one inch (1″) to one and one-half inches (1½″) for the effective length of the abutment 37 in that form of the invention shown in FIGURES 1–5. Accordingly, relatively wide latitude in the adjustment of clearance tolerances is permitted, for, as will be readily apparent, even relatively significant differences in the overall length of the telescoping rod, from its pivotal connection with the arm 141 to its rearmost end 72, will not seriously effect the angle at which the lip is supported when the rear end of the rod bears against the latch plate 81. It is thus entirely feasible to provide adequate clearance between the front face of the latch plate 81 and the adjacent rear end 72 of the rod to enable the latch plate 81 to be swung into its operative position as the lip is elevated. The adjustment of this length is readily effected by having the clevis 52′ by which the front end of the rod is connected to the arm 141 threaded onto the rod 70 and locked in place by a lock nut 85. This adjustment should be such that when the rear end 72 of the telescoped rod bears against the latch plate 81, as shown in FIGURE 11 to support the lip in its elevated position, sufficient clearance remains between the arm 141 and the bridge 16 to provide for the necessary additional motion of the pivoted arm and telescoped rod to assure free positioning of the latch plate during elevation of the lip.

As will no doubt be readily understood, the advantages which flow from having the lip support act upon the lip through a relatively long lever arm and the consequent freedom to provide adequate clearance between the front face of the latch plate 81 and the adjacent rear end of the rod upon which the counterbalancing spring 69 is mounted, are in nowise dependent upon the telescoped two part formation of this rod and the spring 73 which yieldingly holds the two sections of the rod at the limit of their permitted extension. In other words, these advantages are equally inherent in and just as significant in the structure shown in FIGURE 13 which differs from that of FIGURES 8–12 only in the substitution of a solid one-piece rod 88 for the telescoped two-part rod 70–71 and, of course, the omission of the spring 73.

A simplified version of the improved lip support is illustrated in FIGURE 14. In this case the lip lifting and supporting crank arm 90 is held in its operative position by a latch lever 91, which is pivoted as at 92 on an adjacent portion of the ramp, to swing from an inoperative position to which it is biased by its own weight distribution to its operative position shown in FIGURE 14. If desred, the operative position of the latch lever 91 can be defined by a stop 93 on the crank arm. A snap line 94 connected between the lever 91 and the stationary structure of the dockboard serves to swing the latch lever to its operative position as the ramp is raised and the lip is lifted.

Upon lowering of the ramp and the engagement of the lip with the bed of a truck or carrier, the latch lever 91 swings to its inoperative position out of the orbit of the crank arm 90, which is then free to return to its inoperative position when the lip drops to its pendent position.

Although in the structure shown in FIGURE 13, elevation of the lip is not spring assisted, it will be obvious that this feature could be added if desired. It will also be evident that the advantage of having the lip supporting reaction applied to the crank arm near its outer end so that the full length of the arm is utilized and wide latitude in clearance tolerance is achieved, is equally present whether the arm is supported directly by the lip supporting latch, as in FIGURE 14, or indirectly through a rod as in FIGURES 8–13. In each case it is the interpositioning of supporting structure between portions of the crank arm and the ramp which are spaced from the pivot axis of the arm, which serves to hold the arm in its operative lip supporting position.

From the foregoing description taken in connection with the accompanying drawings, it will be readily apparent to those skilled in this art that this invention provides a significant improvement in adjustable dockboards of the type with which this invention is concerned, since by counterbalancing the extension lip in the way it is, only a small proportion of the gravity-produced moment of the lip must be overcome by the ramp raising springs. The limitations heretofore imposed upon the size of the dockboard by the manner in which the extension lip was lifted are thus entirely overcome. It will also be apparent that the manner in which the lip is counterbalanced to assist in the elevation of the lip is in nowise dependent upon the form of the lip raising mechanism, being just as effective whether the lip raising means is of the automatic snap line variety employed in the structure shown in FIGURES 1 to 5, inclusive, or of the manual variety, as in Reissue Patent No. 25,249, or in any other suitable form.

Those skilled in the art will also appreciate the advantages of having the lip support act upon the lip through a relatively long lever arm; and of leaving the lip in its pendent position as the ramp is elevated as in the modified embodiment of the invention shown in FIGURES 6 and 7, wherein the lifting of the lip is completely divorced from the raising of the ramp.

What is claimed as my invention is:

1. In an adjustable dockboard of the type wherein a ramp having front and rear edges has its rear edge hingedly supported so that the ramp may swing up and down about its rear edge, and has an extension lip hingedly connected to its front edge for movement between a pendent position with respect to the ramp and an elevated position forming substantially an extension of the ramp, the improvement which comprises:

(A) energy storing means to counterbalance a portion of the gravity-produced moment of the extension lip about its hinge connection with the ramp;

(B) means operatively connecting the energy storing means with the ramp; and (C) means operatively connecting the energy storing means with the extension lip, whereby the energy storing means reacts between the ramp and the extension lip to impart lifting torque to the extension lip, said last named means including
    structure having a moment arm through which the energy storing means exerts its counterbalancing force upon the extension lip, movement of the extension lip to its pendent position moving said moment arm into substantially its dead center position to thereby substantially nullify the effect of the energy storing means upon the extension lip, and said moment arm being operative to render the counterbalancing effect of the energy storing means upon the extension lip increasingly effective as the extension lip moves from said pendent position towards its elevated position.

2. In an adjustable dockboard, the combination of claim 1 wherein said structure which provides the moment arm is a crank arm mounted to swing in a plane normal to the hinge axis of the extension lip.

3. In an adjustable dockboard, the combination of claim 2,
wherein the crank arm is located at the underside of the ram near the front end thereof, and wherein a push rod mounted under the ramp for endwise movement towards and from the front end of the ramp connects the energy storing means and the crank arm,
one end of the push rod being connected with the energy storing means and the other end of the push rod being connected to the crank arm.

4. In an adjustable dockboard of the type wherein a ramp having front and rear edges has its rear edge hingedly supported so that the ramp may swing up and down about its rear edge, and has an extension lip hingedly connected to its front edge for movement between a pendent position with respect to the ramp and an elevated position forming substantially an extension of the ramp, the improvement which comprises:
(A) spring means strong enough to counterbalance a substantial portion of the gravity-produced moment of the extension lip about its hinge connection with the ramp;
(B) an anchor for one end of the spring means fixed with respect to the ramp;
(C) a crank arm mounted to turn about an axis fixed with respect to the ramp;
(D) means through which the gravity-produced moment of the extension lip is imposed upon the crank arm and tends to turn the crank arm in one direction; and
(E) means forming a pivoted force transmitting connection between the other end of the spring means and the crank arm and through which the force of the spring means acts when the crank arm is not on dead center to impart lip lifting torque to the crank arm, the crank arm being substantially on dead center when the extension lip is in said pendent position.

5. In an adjustable dockboard, the structure of claim 4, further characterized by the fact that said pivoted force transmitting connection between the spring and the crank arm occupies a position slightly beyond dead center when the extension lip is in its pendent position.

6. In an adjustable dockboard, the structure of claim 4, further characterized by:
(A) stationary supporting structure to which the rear edge of the ramp is hingedly connected;
(B) releasable lip supporting means on the ramp operable to support the extension lip in an intermediate position short of its fully elevated position when the lip has been lifted to said intermediate position; and
(C) lip lifting means operatively connected with the stationary supporting structure, the ramp and the extension lip and operable in consequence of movement of the ramp about its hinged connection with the stationary supporting structure, to impart initial lip lifting motion to the crank arm and with the help of the spring means to lift the extension lip far enough to enable the lip supporting means to become operative.

7. The adjustable dockboard of claim 6, further characterized by:
(A) manually releasable biasing means reacting between the stationary supporting structure and the ramp to swing the ramp upward when said biasing means is released; and wherein (B) the lip lifting means of claim 6 includes a snap line connected to the stationary supporting structure to activate the lip lifting means as the ramp rises.

8. The adjustable dockboard of claim 4, wherein said spring means is strong enough to counterbalance the entire gravity-produced moment of the extension lip, and further characterized by:
(A) stationary supporting structure upon which the rear edge of the ramp is supported;
(B) manually releasable biasing means reacting between the stationary supporting structure and the ramp to swing the ramp upward when said biasing means is released, with a force that can be overcome by the application of weight upon the raised ramp, said biasing means including
a part which moves with respect to the stationary supporting structure and the ramp as the ramp is raised and/or lowered;
(C) spring loading means connected with said part and with the end of the spring means which is connected with the crank arm, to load the spring means as said part moves in consequence of lowering of the ramp;
(D) releasable latch means carried by the ramp and operable to hold the spring means in its loaded condition, so that the ramp may be raised with the extension lip in its pendent position; and
(E) means to release the latch means.

9. The adjustable dockboard of claim 8, wherein the means to release the latch means includes a snap line having one end fixed to the stationary supporting structure and its other end connected with the latch means to effect release of the latch means when the snap line becomes taut, so that the latch means is automatically released to allow the loaded spring to swing the extension lip towards its elevated position when the ramp has been raised to a predetermined height.

10. In an adjustable dockboard of the type wherein a ramp having front and rear edges has its rear edge hingedly supported so that the ramp may swing up and down about its rear edge, and has an extension lip hingedly connected to its front edge for movement between a pendent position with respect to the ramp and an elevated position forming substantially an extension of the ramp, the improvement which comprises:
(A) means to counterbalance a portion of the gravity-produced moment of the extension lip about its hinge connection with the ramp; and
(B) means operatively connecting said counterbalancing means with the ramp and with the extension lip and through which the counterbalancing means reacts between the ramp and the extension lip to impart lifting torque to the extension lip as the extension lip moves from said pendent position towards its elevated position,
part of said connecting means forming a moment arm through which the force of the counterbalancing means is translated into lip lifting torque of increasing effectiveness as the extension lip approaches its elevated position, said moment arm being substantially on dead center when the extension lip is in said pendent position to thereby substantially nullify the effect of the counterbalancing means when the extension lip is in said position.

11. In an adjustable dockboard, the structure of claim 10 further characterized by,
lip lifting means operatively connected with said moment arm-forming part and the ramp and operable in consequence of movement of the ramp in one direction about its hinge connection with the mounting structure to simultaneously move the moment arm away from a dead center position and with the help of the counterbalancing means lift the extension lip toward its elevated position.

12. The structure of claim 11 wherein it is elevation of the ramp which effects said operation of the lip lifting means, and further characterized by,
  manually controllable means to raise the ramp about its hingedly supported rear edge.

13. In an adjustable dockboard of the type wherein a ramp having front and rear edges has its rear edge hingedly supported so that the ramp may swing up and down about its rear edge, and has an extension lip hingedly connected to its front edge for movement between a pendent position with respect to the ramp and an elevated position forming substantially an extension of the ramp, the improvement which comprises:
  (A) a crank arm mounted on the ramp to swing in a plane normal to the hinge axis of the extension lip;
  (B) means providing a motion transmitting connection between the crank arm and the extension lip through which
    (1) movement of the crank arm in one direction raises the extension lip, and
    (2) whereby the crank arm occupies a predetermined position with respect to the ramp when the extension lip is in its pendent position with respect to the ramp;
  (C) releasable lip supporting means on the ramp operable to support the extension lip in an intermediate position short of its fully elevated position when the lip has been lifted to said intermediate position;
  (D) means to counterbalance a portion of the gravity-produced moment of the extension lip about the hinge connection with the ramp;
  (E) means operatively connecting the counterbalancing means with the ramp and with the crank arm and through which the counterbalancing means acts to impart an increasing lip lifting torque to the extension lip as the crank arm moves in one direction away from its said position, but substantially no lip lifting torque when the crank arm is in said predetermined position; and
  (F) manually controllable means operatively connected with the crank arm and the extension lip to
    (1) move the crank arm out of said predetermined position in said direction to lift the extension lip and
    (2) with the help of the counterbalancing means to lift the extension lip far enough towards its elevated position to enable the lip supporting means to become operative.

14. In an adjustable dockboard of the type wherein a ramp having front and rear edges has its rear edge hingedly connected to stationary supporting structure so that the ramp may swing up and down about its rear edge, and has an extension lip hingedly connected to its front edge for movement between a pendent position with respect to the ramp and an elevated position forming substantially an extension of the ramp, the improvement which comprises:
  (A) manually controllable biasing means reacting between the stationary structure and the ramp to swing the ramp upwards when said biasing means is released, with a force which can be overcome by the application of weight upon the ramp, so that the ramp may be lowered;
  (B) a bell crank lever pivotally mounted at the front edge portion of the ramp to swing in a plane normal to the hinge axis of the extension lip, one arm of the bell crank lever bearing against the underside of the extension lip, the other arm of the bell crank lever extending along the underside of the ramp when the extension lip is in its pendent position with respect to the ramp, so that a downward pull on said other arm lifts the extension lip;
  (C) a snap line having one end connected to the stationary structure and its other end connected to said other arm of the bell crank lever to impart a downward pull thereon as the ramp rises; and
  (D) lip counterbalancing spring means reacting between the ramp and said other arm of the bell crank lever to partially support the gravity-produced moment of the extension lip about its hinge connection with the ramp and thereby enable a reduction in the force of the biasing means needed to raise the ramp and lift the extension lip.

15. In an adjustable dockboard, the structure of claim 14, wherein
  (A) said spring means is a compression spring; wherein
  (B) one end of the compression spring bears against an abutment fixed to the underside of the ramp; and wherein
  (C) the other end of the compression spring is connected with the bell crank lever at a point which is so disposed with respect to the thrust axis of the spring when the extension lip is in its pendent position that the spring imparts substantially no lip-lifting torque to the bell crank lever,
    so that the counterbalancing spring does not tend to move the extension lip out of its pendent position but is increasingly effective to counterbalance the gravity-produced moment of the extension lip the same after initial lip lifting motion has been imparted to the bell crank lever.

16. In an adjustable dockboard, the structure of claim 15, further characterized by:
  (A) lip supporting means to support the extension lip in an intermediate position short of its fully elevated position, said lip supporting means comprising
    (1) an abutment fixed with respect to the extension lip adjacent to its hinge axis,
    (2) a pawl hingedly mounted at the front edge portion of the ramp in position to have its free end engage said abutment and thereby support the extension lip when the pawl is in its operative position and the extension lip has been raised high enough to carry said abutment past the free end of the pawl,
      (a) the pawl being biased to an inoperative position so that when otherwise unrestrained and the weight of the extension lip is removed from the pawl, the pawl assumes an inoperative position, and
  (B) means operatively connected with the pawl and the stationary structure to move the pawl to its operative position in consequence of elevation of the ramp.

17. In an adjustable dockboard, the structure set forth in claim 16 wherein the means for moving the pawl to its operative position comprises a tension spring connected between the pawl and said snap line.

18. In an adjustable dockboard, the structure of claim 15, further characterized by the fact that
  (A) the abutment which is fixed to the underside of the ramp and against which one end of the compression spring bears, has a hole therethrough, and wherein
  (B) the connection between the other end of the compression spring and the bell crank lever comprises a rod pivotally connected at one end to the bell crank lever,
    (1) the other end portion of the rod being slidably received in said hole in the abutment, and the rod passing lengthwise through the compression spring, and
    (2) an abutment adjustably mounted on said rod and against which said other end of the compression spring bears.

19. The adjustable dockboard of claim 18, wherein the rod is threaded and the abutment on the rod against which the spring bears is a nut threaded on the rod.

20. In an adjustable dockboard of the type wherein a ramp structure having front and rear edges has its rear edge hingedly connected with supporting structure so that the ramp may swing up and down about its rear edge with respect to said supporting structure, and wherein the ramp structure has an extension lip hingedly connected to its front edge for movement between a pendent position with respect to the ramp and an elevated position forming substantially an extension of the ramp structure, the improvement which comprises means for releasably supporting the lip in an elevated position, comprising:

(A) an arm pivoted to a part of the ramp structure to swing in a plane normal to the hinge axis of the lip, between an operative and an inoperative position;

(B) means to move the pivoted arm to its operative position;

(C) means reacting between the pivoted arm and the lip whereby movement of the arm to and retention thereof in its operative position supports the lip in an elevated position, and whereby the gravity-produced moment of the lip about its hinge axis biases the pivoted arm toward its inoperative position and descent of the lip entails movement of the arm out of its operative position;

(D) a stop member movably mounted on the ramp structure at a point spaced from the pivot axis of the arm for movement to and from an operative position;

(E) force transmitting means connected with the arm and cooperative with said stop member when the latter is in its operative position to support the arm in its operative position; and (F) means connected with the stop member and operable to move the same to its operative position.

21. The adjustable dockboard of claim 20, wherein the means to move the stop member is operatively connected between the stop member and the stationary structure so as to be responsive to relative motion between the said structures, whereby the stop member is moved to its operative position in consequence of raising of the ramp structure.

22. The adjustable dockboard of claim 20, wherein the means to move the pivoted arm to its operative position comprises means connected between the arm and the stationary structure and operable to translate relative motion between said structures into movement of the arm about its pivot, so that the arm is moved to its operative position in consequence of raising of the ramp structure.

23. The adjustable dockboard of claim 20, wherein the means to move the pivoted arm to its operative position and also the means to move the stop member to its operative position, are actuated by and are responsive to relative motion between said structures.

24. The adjustable dockboard of claim 20, wherein said means which reacts between the arm and the lip to support the lip constitutes a forwardly directed projection on the arm to engage and lift the lip as the arm moves to its operative position.

25. The adjustable dockboard of claim 24, further characterized by spring means reacting between portions of the ramp structure and the pivoted arm which are spaced from the pivot axis of the arm to impart torque to the arm in the direction to lift the lip and thereby counterbalance a portion of the gravity-produced moment of the lip about its hinge axis.

26. The adjustable dockboard of claim 20, wherein the pivoted arm is located near the front edge of the ramp structure and the stop member is remote from the front edge thereof, wherein the force transmitting means comprises rod means having a front end portion pivotally connected to the arm and a rear end portion which moves back and forth as the arm swings on its pivot; and guide means on the ramp structure slidably supporting the rear end portion of the rod means in position for engagement with the stop member when the arm and the stop member are in their operative positions.

27. The adjustable dockboard of claim 26, wherein the front and rear end portions of the rod means are relatively longitudinally movable, and spring means yieldingly urging the front and rear end portions of the rod means apart but yielding upon the application of force thereon in excess of that applied by the gravity-produced moment of the extended lip, so that upon the application of external force on the elevated lip, the lip can fold down before the occurrence of damage thereto or its mounting.

28. In an adjustable dockboard of the type wherein a ramp structure having front and rear edges has its rear edge hingedly connected with a supporting structure so that the ramp structure may swing up and down about its rear edge with respect to the supporting structure, and wherein the ramp structure has an extension lip hingedly connected to its front edge for movement between a pendent position with respect to the ramp and an elevated position forming substantially an extension of the ramp structure, the improvement which comprises:

(A) a crank arm pivoted to the front end portion of the ramp structure to swing in a plane normal to the hinge axis of the lip between an inoperative rearwardly extending position and an operative position directed generally downwardly toward the supporting structure;

(B) means to react between the crank arm and the lip and through which movement of the crank arm from its inoperative to its operative position lifts the lip to an elevated position, and retention of the crank arm in its operative position supports the lip in said elevated position so that the gravity-produced moment of the lip about its hinge axis biases the crank arm toward its inoperative position and descent of the lip entails movement of the crank arm out of its operative position;

(C) rod means pivotally connected to the outer end portion of the crank arm and extending therefrom toward the rear edge of the ramp structure;

(D) means slideably supporting the rod means for endwise fore and aft movement as the crank arm is swung on its pivot;

(E) stop means movably mounted on the ramp structure for movement to an operative position engageable with a part on the rod means when the latter has moved forward in consequence of lip elevating motion of the crank arm, to hold the rod means against rearward motion and thereby hold the crank arm in its lip supporting position;

(F) means connected with the crank arm for moving the latter from its inoperative to its operative position; and (G) means connected with the stop means for moving the same to its operative position.

29. The adjustable dockboard of claim 28, wherein the means for moving the crank arm and the stop means to their operative positions function in consequence of relative motion between said structures as the ramp structure is raised.

30. The adjustable dockboard of claim 28, further characterized by a counterbalancing spring on said rod means, reacting between a part on the rod means and a part fixed with respect to the ramp structure, to bias the rod means forwardly and thereby counterbalance a portion of the gravity-produced moment of the lip about its hinge axis.

31. The adjustable dockboard of claim 28, wherein said rod means comprises
telescopingly connected front and rear sections, the front section being connected with the crank arm and the rear section being engageable with the stop means, a spring reacting between the telescopingly connected sections urging the same apart, and means to limit the spring-produced separation of said sections, so that said sections act as one single unit as long as the force of said spring is not overcome.

32. The adjustable dockboard of claim 31, further characterized by a second spring reacting between the front section of the rod means and an abutment fixed with respect to the ramp structure, to urge the rod means forwardly, said springs together being capable of supporting the entire gravity-produced moment of the lip about its hinge axis, but yielding under force greater than that imposed thereon by said moment of the lip, so that the sections of the rod means yieldingly approach one another upon the application of external force on the lip tending to push the same down.

No references cited.

JACOB L. NACKENOFF, *Primary Examiner.*